United States Patent [19]

Hirata et al.

[11] Patent Number: 5,140,055
[45] Date of Patent: Aug. 18, 1992

[54] RUBBER COMPOSITION

[75] Inventors: Yasushi Hirata, Sayama; Kazuya Hatakeyama, Kodaira, both of Japan

[73] Assignee: Bridgestone Corporation, Tokyo, Japan

[21] Appl. No.: 727,395

[22] Filed: Jul. 5, 1991

Related U.S. Application Data

[63] Continuation of Ser. No. 229,775, Aug. 5, 1988, abandoned, which is a continuation of Ser. No. 66,439, Jun. 26, 1987, abandoned.

[30] Foreign Application Priority Data

Jul. 1, 1986 [JP] Japan .................. 61-152613
Sep. 9, 1986 [JP] Japan .................. 61-210777
Dec. 3, 1986 [JP] Japan .................. 61-286771

[51] Int. Cl.$^5$ .................................................. C08K 5/34
[52] U.S. Cl. ........................... 524/93; 524/100; 524/105; 524/106; 152/DIG. 4; 152/DIG. 14
[58] Field of Search ............... 524/93, 100, 105, 106; 152/DIG. 4, DIG. 14

[56] References Cited

U.S. PATENT DOCUMENTS

| | | | |
|---|---|---|---|
| 2,649,134 | 8/1953 | Steinle .................... | 156/123 |
| 2,754,216 | 7/1956 | Chenicek .................. | 524/93 |
| 2,995,540 | 8/1961 | Duennenberger et al. .... | 524/93 |
| 3,369,004 | 2/1968 | Stanton .................... | 154/14 |
| 3,637,584 | 1/1972 | Hurlock et al. ............ | 524/105 |
| 3,987,054 | 10/1976 | Butula .................... | 524/93 |

FOREIGN PATENT DOCUMENTS 1564308 3/1968 France.

OTHER PUBLICATIONS

Chemical Abstracts vol. 96, 96:53585h, 1982.

*Primary Examiner*—Kriellion S. Morgan
*Attorney, Agent, or Firm*—Sughrue, Mion, Zinn, Macpeak & Seas

[57] ABSTRACT

A rubber composition containing a specifically limited imidazole compound or imidazoline compound, or benzimidazole or its specifically limited derivative has a large tan δ at high temperature range, and a tire having a tread using such rubber composition is prevented from being lowered in the value of tan δ due to the temperature rising during the running and has an improved grip performance during the high speed running. The use of Brønsted acid in combination with the imidazole, imidazoline or benzimidazole can obviate the drawback of poor scorch resistance of a rubber composition containing the imidazole, imidazoline or benzimidazole alone, and the resulting rubber composition has a very large tan δ at high temperature range, and a tire having a tread using the rubber composition has a remarkably improved grip performance during the high speed running.

2 Claims, No Drawings

RUBBER COMPOSITION

This is a continuation of application Ser. No. 07/229,775, filed Aug. 5, 1988, now abandoned, which is a continuation of application Ser. No. 07/066,439, filed Jun. 26, 1987, now abandoned.

BACKGROUND OF THE INVENTION

1) Field of the Invention

The present invention relates to a rubber composition adapted for various rubber articles, such as tire, vibration-damping rubber, fender and the like, and more particularly relates to a rubber composition adapted to be used as a tread rubber of pneumatic tire having excellent grip performance.

2) Description of Related Art

Recently, pneumatic tires having high driving performance have been increasingly demanded corresponding to the improvement of the performance of automobile and to the developments of paved roads and high speed road network. Particularly, grip performance is an important property demanded in pneumatic tire, and is generally estimated by the acceleration performance and brake performance. Accordingly, a car provided with a pneumatic tire having higher acceleration performance and brake performance can be driven more accurately and safely at high speed.

In the conventional method for producing a pneumatic tire having high grip performance, it is necessary to use a tread rubber composition having a large tan $\delta$, which is obtained by using a styrene-butadiene copolymer rubber having a high styrene content (that is, having a high glass transition temperature) or by using a styrene-butadiene copolymer rubber blended with large amounts of process oil and carbon black.

As a method for preventing the lowering of grip performance of a tire due to the temperature rising, Japanese Patent Laid-open Application No. 187,011/84 discloses the use of a copolymer rubber obtained by copolymerizing a monomer, such as 1,3-butadiene, styrene, isoprene or the like, with an acrylate or methacrylate compound containing diphenyl phosphate group, such as diphenyl-2-methacryloyloxyethyl phosphate, diphenyl-2-acryloyloxyethyl phosphate or the like.

However, when a styrene-butadiene copolymer rubber having a high styrene content is used in order to obtain a tire having high grip performance, the resulting tire has surely high grip performance, but the tan $\delta$ value of the rubber is lowered due to the temperature rising of the rubber caused by the running of the tire, and the grip performance of the tire is noticeably lowered. While, although a tire having high grip performance can be obtained by using a styrene-butadiene copolymer rubber composition having high contents of process oil and carbon black, there are certain upper limit values in the contents of process oil and carbon black in the rubber composition, and a rubber composition containing extremely large amounts of process oil and carbon black is very poor in the breakage resistance and wear resistance. Further, the method described in the above described Japanese Patent Laid-open Application No. 187,011/84, which aims to prevent the lowering of grip performance of a tire due to the temperature rising of rubber constituting the tire, has such a drawback that the method can not be applied to natural rubber and further damages excellent properties inherent to polymers, for example, styrene-butadiene copolymer rubber, polybutadiene rubber and the like, depending upon the production condition of the polymers.

SUMMARY OF THE INVENTION

The inventors have made various investigations in order to solve the above described problems, and have found that, when a specifically limited amount of a specifically limited imidazole compound or imidazoline compound is compounded to a rubber component, a rubber composition having a large tan $\delta$ at high temperature range can be obtained, and the use of such rubber composition in the tread of tire can improve the grip performance of tire at the high speed running, whereby the above described problems can be solved. As the result, the present invention has been achieved.

The inventors have further found out that, when a specifically limited amount of benzimidazole or its specifically limited derivative is compounded to a rubber component, the same effect at that in the use of imidazole compound or imidazoline compound can be attained.

The inventors have further investigated and found that, when the specifically limited imidazole compound, imidazoline compound or benzimidazole compound is compounded to a rubber component together with a Brφnsted acid, the resulting rubber composition has an improved scorch resistance and an improved workability, and hence the rubber composition has synergistically a very large tan $\delta$ at high temperature range.

That is, the first aspect of the present invention lies in a rubber composition, comprising 100 parts by weight of a rubber component consisting of natural rubber and/or synthetic rubber and 0.1–50 parts by weight of at least one member selected from the group consisting of imidazole compounds and imidazoline compounds.

The second aspect of the present invention lies in a rubber composition, comprising 100 parts by weight of a rubber component consisting of natural rubber and/or synthetic rubber, 0.1–50 parts by weight of at least one member selected from the group consisting of benzimidazole and its derivatives having a substituent other than mercapto group in its 2-position.

The third aspect of the present invention lies in a rubber composition, comprising 100 parts by weight of a rubber component consisting of natural rubber and/or synthetic rubber, 0.1–50 parts by weight of either at least one member selected from the group consisting of imidazole compounds and imidazoline compounds or at least one member selected from the group consisting of benzimidazole and its derivatives having a substituent other than mercapto group in its 2-position, and 0.1–50 parts by weight of a Brφnsted acid.

DESCRIPTION OF THE PREFERRED EMBODIMENT

In the present invention, natural rubber or synthetic rubber alone or a blend thereof can be used as a rubber component. As the synthetic rubber, there can be used synthetic polyisoprene rubber, polybutadiene rubber, styrene-butadiene rubber and the like.

The imidazole compound and imidazoline compound to be used in the first and third aspects of the present invention are as follows.

The imidazole compounds are ones represented by the following general formulae:

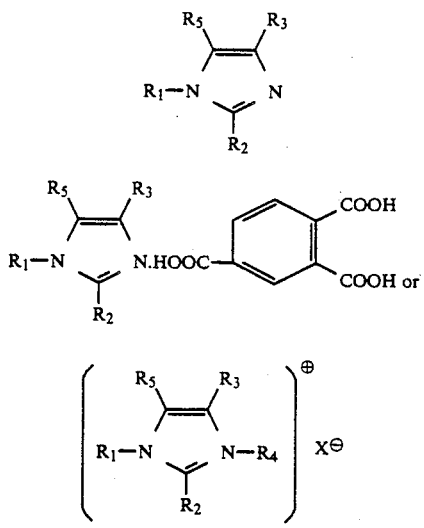

(Type I)

(Type II)

(Type III)

wherein at least one of $R_1$, $R_2$, $R_3$, $R_4$ and $R_5$ represents a hydrogen atom, alkyl group, cyanoalkyl group, benzyl group, aryl group, sulfonyl group, carbonyl group, silyl group, nitro group, halogen atom, mercapto group, $-(CH_2)_n-O-(CH_2)_mCN$, $-(CH_2)_nOH$, $-COOC_nH_{2n+1}$ or

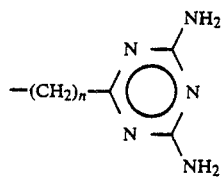

(wherein m and n are positive integers of 1–20), and X represents a halogen atom.

The imidazoline compounds are ones represented by the following general formula:

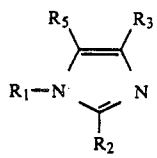

wherein at least one of $R_1$, $R_2$, $R_3$ and $R_5$ represents a hydrogen atom, alkyl group, cyanoalkyl group, benzyl group, aryl group, sulfonyl group, carbonyl group, silyl group, nitro group, halogen atom, mercapto group, $-(CH_2)_n-O-(CH_2)_mCN$, $-(CH_2)_nOH$, $-COOC_nH_{2n+1}$ or

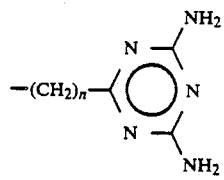

(wherein m and n are positive integers of 1–20).

The imidazole compounds of the above described Type I include 2-methylimidazole (2MZ), 2-undecylimidazole (C11Z), 2-heptadecylimidazole (C17Z), 2-phenylimidazole (2PZ), 2-ethyl-4-methylimidazole (2E4MZ), 2-phenyl-4-methylimidazole (2P4MZ), 1-benzyl-2-methylimidazole (1B2MZ), 1-cyanoethyl-2-methylimidazole (2MZ-CN), 1-cyanoethyl-2-undecylimidazole (C11Z-CN), 1-cyanoethyl-2-phenylimidazole (2PZ-CN), 1-cyanoethyl-2-ethyl-4-methylimidazole (2E4MZ-CN), 2,4-diamino-6-{2'-methylimidazolyl(1')}ethyl-S-triazine (2MZ-AZINE), 2,4-diamino-6-{2'-undecylimidazolyl(1')}ethyl-S-triazine (C11Z-AZINE), 2,4-diamino-6-{2'-ethyl-4'-methylimidazolyl(1')}ethyl-S-triazine (2E4MZ-AZINE), 1-(p-toluenesulfonyl)imidazole (PTZ), 2,4,5-tribromoimidazole (TBZ), 4-methylimidazole (4MZ), N-trimethylsilylimidazole (TSZ), 2-mercapto-1-methylimidazole (1M2MrZ), p-(imidazole-1-yl)phenol (4ZP), N-acetylimidazole (1AZ), urocanic acid (U-acid), imidazole-4,5-dicarboxylic acid (ZD-acid), 1-(2,4,6-trimethylbenzenesulfonyl)imidazole, 2-methyl-5-nitro-1-imidazcle-ethanol (2M5N1EZ), 2-nitroimidazole, 4-phenylimidazole, 1,1'-carbonyldiimidazole, 4,5-diphenylimidazole, 2,2'-dithiobis(4-tertiary butyl-1-isopropylimidazole), ethyl 4-methyl-5-imidazole carboxylate, histidine, 2-phenyl-4,5-dioxymethylimidazole (2PHZ), 2-phenyl-4-methyl-5-oxymethylimidazole (2P4MHZ),

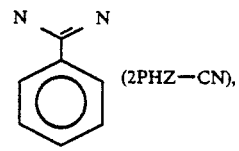

(2PHZ—CN),

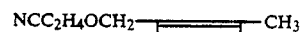
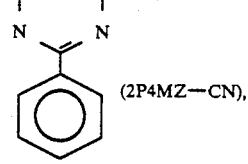

(2P4MZ—CN), imidazole sodium derivative, 4'-(imidazole-1-yl)acetophenone, 1-methylimidazole, 2-methylimidazole, 4-methylimidazole, 1,1'-thiocarbonyldiimidazole, 1-(2,4,6-triisopropylbenzenesulfonyl)imidazole, 2,4,5-triphenylimidazole, 1-vinylimidazole, N-ω-acetylhistamine, N-α-acetyl-L-histidine monohydrate, L-carnosine, N-trans-cinnamoylimidazole, 2,4-dimethylimidazole, 1,2-dimethylimidazole, 4,5-diphenyl-2-imidazole thiol, 2-ethylimidazole, 2-ethyl-4-methylimidazole, N,N'-bis[3-(4,5-dihydro-1H-imidazole 2-yl)phenyl]urea dipropanoate, 2,2'-bis(4,5-dimethylimidazole), 1-benzylimidazole and the like.

The imidazole compounds of the type II include 1-cyanoethyl-2-methylimidazole trimellitate (2MZ-CNS), 1-cyanoethyl-2-phenylimidazole trimellitate (2PZ-CNS), 1-cyanoethyl-2-undecylimidazole trimellitate (C11Z-CNS), 1-cyanoethyl-2-ethyl-4-methylimidazole trimellitate (2E4MZ-CNS), 1,2-diundecylimidazole (2C11Z), 1-stearyl-undecylimidazole (C18C11Z) and the like.

The imidazole compounds of the type III include 1-dodecyl-2-methyl-3-benzylimidazolium chloride (SFZ), 1,3-dibenzyl-2-methylimidazolium chloride (FFZ), 4-(hydroxymethyl)imidazole hydrochloride, 4-imidazole acetic acid hydrochloride, propyl dl-1-(1- phenylethyl)-imidazole-5-carboxylate hydrochloride and the like.

The imidazoline compounds include 2-methylimidazoline (2MZL), 2-phenylimidazoline (2PZL), 2-methylthio-2-imidazoline hydrochloride, 2-(1-naphthylmethyl)-2-imidazoline hydrochloride, tolazoline hydrochloride and the like.

These imidazole compounds and imidazoline compounds can be used alone or in admixture of at least two members.

In the specification, the "imidazole compound" or "imidazoline compound" may be merely referred to as "imidazole" or "imidazoline" respectively hereinafter.

In the first and third aspects of the present invention, the amount of the imidazole or imidazoline to be used is limited to 0.1-50 parts by weight based on 100 parts by weight of rubber component. The reason is as follows. When the amount is less than 0.1 part by weight, the effect of the use of the imidazole or imidazoline does not satisfactorily appear. While, when the amount exceeds 50 parts by weight, the effect of the compound does not so increase as is expected corresponding to the addition amount, and further the compound affects adversely to the properties of the vulcanizate of the resulting rubber composition.

In the second and third aspects of the present invention, benzimidazole or its above described derivative is used. As the benzimidazole derivative, there can be preferably used ones represented by the following formula:

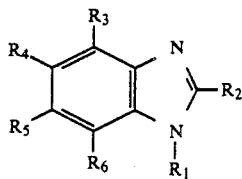

wherein $R_1$ represents a hydrogen atom or alkyl group having 1-17 carbon atoms; $R_2$ represents a hydrogen atom, alkyl group having 1-17 carbon atoms, hydroxyl group, anilino group, guanidino group, chloromethyl group, dichloromethyl group, trichloromethyl group, pyridimo group, acetonitrile group, ureido group, or aryl group, which has occasionally a substituent or substituents of at least one of alkyl group, alkoxy group and halogen atom; and $R_3$-$R_6$ are same or different and represent hydrogen atoms, halogen atoms, methyl groups, phenyl group, nitro groups, or

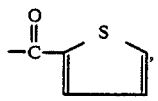

provided that at least two members of $R_3$-$R_6$ are hydrogen atoms.

As these benzimidazole derivatives, there can be mentioned 2-anilinobenzimidazole (ABI), 2-phenylbenzimidazole (PBI), 2-hydroxybenzimidazole (HBI), 2-methylbenzimidazole (MBI), 2-heptadecylbenzimidazole (HDBI), 2-p-n-butylphenyltenzimidazole (BPBI), 2-p-octyloxyphenylbenzimidazole (OOPBI), 2-phenyl-5-methylbenzimidazole (PMBI), 2-phenyl-5,6-dimethylbenzimidazole (PDMBI), 2-p-chlorophenylbenzimidazole (CPBI), 1-methyl-4-phenylbenzimidazole (MPBI), 6-nitrobenzimidazole (NBI), nocodazole (NZ), 2-(2-pyridino)benzimidazole (PDBI), 2-(4-fluorophenyl)-1-methylbenzimidazole (FPMBI), 2-guanidinobenzimidazole (GBI), 2-chloromethylbenzimidazole (CBI), 5-chloro-2-trichloromethyl)benzimidazole (CTCMBI), 5,6-dimethylbenzimidazole (DMBI), 1-ethyl-2-methylbenzimidazole (EMBI), benzimidazolyl urea (BIU), 2-acetonitrilebenzimidazole (ANBI) and the like. In the use of the above described benzimidazole derivatives in the following examples, when the benzimidazole derivatives were sold in the market as a reagent, ones sold by Aldrich Chemical Co. were used, and when the benzimidazole derivatives were not sold in the market, the benzimidazole derivatives were synthesized in the Synthesis examples explained later.

In the specification, not only "benzimidazole itself", but also "benzimidazole derivative" may be referred to as "benzimidazole" hereinafter.

In the second and third aspects of the present invention, the amount of the benzimidazole or its derivative to be used is limited to 0.1-50 parts by weight based on 100 parts by weight of rubber component. The reason is as follows. When the amount is less than 0.1 part, the effect of the use of benzimidazole or its derivative does not satisfactorily appear, while when the amount exceeds 50 parts by weight, the effect of the use of benzimidazole or its derivative does not so increase as is expected corresponding to the addition amount, and further the benzimidazole or its derivative affects adversely the properties of the vulcanizate of the resulting rubber composition.

The Brφnsted acid to be used in the third aspect of the present invention in combination with the imidazole, imidazoline or benzimidazole includes phenol derivative, carboxylic acid, sulfonic acid, sulfuric acid and its derivative, phosphoric acid and its derivative, cyanuric acid and its derivative, sulfinic acid, nitric acid and its derivative, phosphorous acid and carbonic acid and its derivative. These compounds are concretely 2,6-ditert-butyl-p-cresol, 2,2'-methylenebis-4-methyl-6-tert-butylphenol, 2,5-di-tert-butylhydroquinone, 4,4'-thiobis-3-methyl-6-tertbutylphenol, styrenated p-cresol, 4,4'-butylidenebis-3-methyl-6-tert-butylphenol, acetic acid, succinic acid, stearic acid, oleic acid, rhodinic acid, maleic acid, benzoic acid, p-methoxybenzoic acid, p-chlorobenzoic acid, p-nitrobenzoic acid, cinnamic acid, α-naphthylcarboxylic acid, phthalic acid, trimellitic acid, pyromellitic acid, phthalic anhydride, benzenesulfonic acid, benzenesulfonic acids having an alkyl substituent having 1-12 carbon atoms, u-naphthalenesulfonic acid, sulfuric acid, sulfuric acid monomethyl ester, phosphoric acid, phosphoric acid mono(2-ethylhexyl) ester, phosphoric acid di(2-ethylhexyl) ester, cyanuric acid, cyanuric acid diamide, benzenesulfinic acid, p-toluenesulfinic acid, phosphorous acid, phosphorous acid dimethyl ester, phosphorous acid diphenyl ester, O,O'-dimethyl-dithiophosphoric acid, O,O'-bis(2-ethylhexyl)-dithiophosphoric acid, carbonic acid, ammonium hydrogencarbonate and the like.

These Brφnsted acids can be used alone or in admixture of at least two members. When a Brφnsted acid is compounded to a rubber component, the Brφnsted acid may be previously mixed with an imidazole, imidazoline or benzimidazole, and then the resulting mixture may be compounded to a rubber component, or the Brφnsted acid and the imidazole, imidazoline or benzimidazole may be separately compounded to a rubber component.

In the third aspect of the present invention, the amount of the Brønsted acid to be used is limited to 0.1–50 parts by weight based on 100 parts by weight of rubber component. The reason is as follows. When the amount of Brønsted acid is less than 0.1 part by weight, the Brønsted acid can not give a satisfactorily high scorch resistance to the resulting rubber composition. While, when the amount exceeds 50 parts by weight, the effect of the use of the Brønsted acid does not so increase as is expected corresponding to the addition amount, and further the Brønsted acid affects adversely the properties of the vulcanizate of the resulting rubber composition.

The rubber composition of the present invention may occasionally contain, in addition to the above described imidazole, imidazoline, benzimidazole and Brønsted acid, commonly used amount of additives, which are ordinarily used in the rubber industry, such as reinforcing agent, softener, antioxidant, vulcanization accelerator, vulcanization supplement accelerator, vulcanizer and the like.

The imidazole, imidazoline and benzimidazole to be used in the present invention are effective for increasing the mutual action between rubber molecule and rubber molecule, between rubber molecule and reinforcing agent particle (particularly, carbon black particle), and between reinforcing agent particle and reinforcing agent particle, and hence a rubber composition having a large tan δ value even at high temperature can be obtained.

When the imidazole, imidazoline or benzimidazole is used in combination with a Brønsted acid as disclosed in the third aspect of the present invention, the drawback of poor scorch resistance inherent to a rubber composition containing imidazole, imidazoline or benzimidazole alone can be eliminated, and the resulting rubber composition has an improved scorch resistance and has a very large tan δ value at high temperature by the synergistic action of the imidazole, imidazoline or benzimidazole and the Brønsted acid.

The present invention will be explained hereinafter referring to the following Examples, Comparative examples and Synthetic examples.

EXAMPLES 1–34 AND COMPARATIVE EXAMPLE 1

A rubber composition consisting of 100 parts by weight of a styrene-butadiene rubber, 37.5 parts by weight by aroma oil, 65 parts by weight of ISAF carbon black and 3 parts by weight of zinc oxide was compounded with 0.01 mol of various imidazoles or 2-phenylimidazoline (2PZL) shown in the following Table 1 together with variant amounts of 1,3-diphenylguanidine, 2-mercaptobenzothiazole and sulfur, and the resulting mixtures were vulcanized such that the resulting vulcanizates would have substantially the same modulus. Each of the resulting vulcanizates was measured with respect to its tan δ at 80° C. under a 1% dynamic strain by means of a viscoelastometer made by Rheometrix Co. The obtained results are shown in Table 1.

Examples 1–27 and 34 illustrate embodiments using an imidazole of type I, Examples 28–31 illustrate embodiments using an imidazole of type II, and Example 32 illustrates an embodiment using an imidazole of type III.

The value of tan δ of the vulcanizate of a rubber composition containing neither an imidazole compound nor 2-phenylimidazoline was measured in the same manner as described above, and the obtained result is also shown in Table 1 as Comparative Example 1.

It can be seen from the results shown in Table 1 that all the rubber compositions obtained in Examples 1–34 are higher in the value of tan δ at high temperature range than the rubber composition obtained in Comparative Example 1.

TABLE 1

|  | Comparative example 1 | Example 1 | Example 2 | Example 3 | Example 4 | Example 5 | Example 6 | Example 7 | Example 8 |
|---|---|---|---|---|---|---|---|---|---|
| Imidazole or imidazoline used (abbreviation) | — | 2MZ | C11Z | C17Z | 2PZ | 2E4MZ | 2P4MZ | 1B2MZ | 2MZ-CN |
| Tan δ at 80° C. | 0.173 | 0.191 | 0.207 | 0.198 | 0.225 | 0.216 | 0.238 | 0.195 | 0.213 |

|  | Example 9 | Example 10 | Example 11 | Example 12 | Example 13 | Example 14 | Example 15 | Example 16 | Example 17 | Example 18 |
|---|---|---|---|---|---|---|---|---|---|---|
| Imidazole or imidazoline used (abbreviation) | C11Z-CN | 2PZ-CN | 2MZ-AZINE | C11Z-AZINE | 2E4MZ-AZINE | PTZ | TBZ | 4MZ | TSZ | 1M2MrZ |
| Tan δ at 80° C. | 0.207 | 0.227 | 0.203 | 0.209 | 0.214 | 0.208 | 0.210 | 0.215 | 0.210 | 0.217 |

|  | Example 19 | Example 20 | Example 21 | Example 22 | Example 23 | Example 24 | Example 25 | Example 26 | Example 27 | Example 28 |
|---|---|---|---|---|---|---|---|---|---|---|
| Imidazole or imidazoline used (abbreviation) | 4ZP | 1AZ | U-Acid | ZD-Acid | 2M5N1EZ | 2P4MHZ | 2PHZ | 2P4MHZ-CN | 2PHZ-CN | 2MZ-CNS |
| Tan δ at 80° C. | 0.212 | 0.223 | 0.218 | 0.220 | 0.210 | 0.227 | 0.238 | 0.231 | 0.225 | 0.208 |

|  | Example 29 | Example 30 | Example 31 | Example 32 | Example 33 | Example 34 |
|---|---|---|---|---|---|---|
| Imidazole or imidazoline used (abbreviation) | C11Z-CNS | 2PZ-CNS | 2E4MZ-CNS | SFZ | 2PZL | C18C11Z |

TABLE 1-continued

| | | | | | | |
|---|---|---|---|---|---|---|
| Tan δ at 80° C. | 0.212 | 0.211 | 0.206 | 0.213 | 0.218 | 0.195 |

(Note)
(1) Imidazoles used in Examples 1–32 are commercially available imidazoles sold by Shikoku Fine Chemicals Co., Ltd.
(2) Imidazoline used in Example 33 is a reagent imidazoline sold by Aldrich Chemical Co.
(3) Imidazole used in Example 34 was synthesized by a commonly known method.

EXAMPLES 35–40 AND COMPARATIVE EXAMPLE 2

A rubber composition consisting of 100 parts by weight of a styrene-butadiene rubber having a styrene content of 35%, 80 parts by weight of ISAF carbon black, 100 parts by weight of aroma oil, 1 part by weight of stearic acid, 1 part by weight of an antioxidant (IPPD), 3 parts by weight of zinc oxide, 0.3 part by weight of an accelerator of DPG, 0.7 part by weight of an accelerator of DM, and 1.5 parts by weight of sulfur was compounded with 5 parts by weight of each of 2P4MZ, 2PZ-CN, 4PZ, 2PHZ-CN and 1!-Acid, or compounded with a mixture of 3 parts by weight of 2P4MZ and 3 parts by weight of SFZ to prepare rubber compositions. A tire having a size of 205/515-13 (for front wheel) or 225/515-13 (for rear wheel) was produced by using each of the above obtained rubber compositions in its tread rubber.

The tire was driven at a speed as high as possible on a circuit having a one-round length of 4.41 km, and lap times in every lap from 10th to 20th laps were measured, and the best lap time among 10th to 20th laps was determined. For comparison, a tire of Comparative Example 2 was produced in the same manner as described in the above Examples 35–40 by using a rubber composition containing neither imidazole nor imidazoline defined in the present invention, and the best lap time among 10th to 20th laps was determined in the same manner as described above. The best lap time of the tire of Comparative Example 2 was calculated as an index 100, and the best lap time of the tire of Examples 35–40 was indicated by an index, which is a reciprocal of the ratio of the best lap time of the tire of Examples 35–40 to that of the tire of Comparative Example 2.

The obtained results are shown in the following Table 2.

In Table 2, a larger index illustrates that the lap time is shorter, and the grip performance at high speed running of the tire is more excellent.

It can be seen from the results shown in Table 2 that all the rubber compositions containing the imidazole or imidazoline according to the present invention are higher in grip performance than the rubber composition containing neither imidazole nor imidazoline.

was dropwise added to the acetone solution in 1 hour while keeping the resulting mixture at 15° C., and further a reaction of the diphenylthiourea with the dimethyl sulfate was effected at 60° C. for 4 hours. Then, the reaction mass was poured into ice water. After the reaction mass was dissolved, the resulting solution was filtered, the filtrate was neutralized with an aqueous solution of soda ash, and then the resulting precipitate was filtered, and the filter cake was washed with water to obtain S-methyl-N,N-diphenylisothiourea having a melting point of 103.5°–106° C. in an yield of 235.5 g (97.3%).

Then, 101.2 g (0.973 mol) of o-phenylenediamine and 235.5 g (0.973 mol) of S-methyl-N,N-diphenylisothiourea were changed into a four-necked flask of 1 l capacity, and reacted at 140° C. for 10 hours. The reaction product was cooled and filtered, and the filter cake was washed with xylene to obtain the aimed 2-anilinobenzimidazole having a melting point of 193.2°–194.5° C. in an yield of 149.2 9 (73.2%).

SYNTHETIC EXAMPLE 2

2-Hydroxybenzimidazole (HBI)

Into a four-necked flask of 1 l capacity were charged 64.8 g (0.6 mol) of o-phenylenediamine, 31.3 g (0.5 mol) of hydrochloric acid, 36.0 g (0.6 mol) of urea and 50 ml of xylene, and a reaction was effected at 140°–150° C. for 5 hours while distilling out 20 ml of water. Then, the reaction product was charged into a four-necked flask of 1 l capacity, into which 30 g (0.75 mol) of sodium hydroxide and 600 ml of water had been previously charged, and the resulting mixture was stirred at 80° C. for 15 hours. Then, thus treated mixture was filtered while it was hot, and the filtrate was cooled to form a precipitate. The resulting precipitate was filtered, and the filter cake was washed with water to obtain the aimed 2-hydroxybenzimidazole having a melting point of 316°–317° C. in an yield of 53.6 g (66.6%).

SYNTHETIC EXAMPLE 3

2-Heptadecylbenzimidazole (HDBI)

Into a four-necked flask of 2 l capacity were charged 54.0 g (0.5 mol) of o-phenylenediamine, 142 g (0.5 mol) of stearic acid and 500 ml of 4N-hydrochloric acid, and

TABLE 2

| | Comparative example 2 | Example 35 | Example 36 | Example 37 | Example 38 | Example 39 | Example 40 |
|---|---|---|---|---|---|---|---|
| Imidazole or imidazoline used (abbreviation) | — | 2P4MZ | 2PZ-CN | 4ZP | 2PHZ-CN | U-Acid | mixture of 2P4MZ and SFZ |
| Best lap time among 10th to 20th laps | 100 | 106 | 105 | 103 | 105 | 105 | 107 |

SYNTHETIC EXAMPLE 1

2-Anilinobenzimidaze (ABI)

Into a four-necked flask of 1 l capacity were charged 228 g (1.0 mol) of sym-diphenylthiourea and 200 ml of acetone, and then 126.0 g (1.0 mol) of dimethyl sulfate a reaction was effected for 5 hours while refluxing the reaction solution. Then, 500 ml of water was added to the reaction mass, and the resulting solution was neutralized up to a pH of 9.2 at a temperature of not higher than 15° C. with a 20% aqueous solution of sodium hydroxide. Then, the resulting mixture was stirred at a temperature of not higher than 15° C. for 1 hour, and then filtered. The filter cake was washed with water to obtain the aimed 2-heptadecylbenzimidazole in an yield of 139.5 g (78.4%).

SYNTHETIC EXAMPLE 4

2-p-n-Butylphenylbenzimidazole (BPBI)

Into a four-necked flask of 1 l capacity were charged 40.5 g (0.25 mol) of p-n-butylbenzaldehyde, 27.0 g (0.25 mol) of o-phenylenediamine, 28.6 g (0.23 mol) of sodium sulfite and 350 ml of dimethylformaldehyde, and a reaction was effected for 1 hour while refluxing the reaction solution. Then, 250 ml of water was added to the reaction mass, and the resulting mixture was cooled and filtered. The filter cake was washed with water to obtain the aimed 2-p-n-butylphenylbenzimidazole in an yield of 52.2 g (82.9%).

SYNTHETIC EXAMPLE 5

2-p-Octyloxyphenylbenzimidazole (OOPBI)

The operation of Synthetic example 4 was repeated, except that 58.5 g (0.25 mol) of p-octyloxybenzaldehyde was used in place of p-n-butylbenzaldehyde, to obtain the aimed 2-p-octyloxyphenylbenzimidazole in an yield of 56.8 g (70.1%).

SYNTHETIC EXAMPLE 6

2-Phenyl-5-methylbenzimidazole (PMBI)

The operation of Synthetic example 4 was repeated, except that 30.5 g (0.25 mol) of 3,4-diaminotoluene was used in place of o-phenylenediamine, to obtain the aimed 2-phenyl-5-methylbenzimidazole in an yield of 43.1 g (82.1%).

SYNTHETIC EXAMPLE 7

2-Phenyl-5,6-dimethylbenzimidazole (PDMBI)

The operation of Synthetic example 4 was repeated, except that 34.0 g (0.25 mol) of 4,5-diamino-o-xylene was used in place of o-phenylenediamine, to obtain the aimed 2-phenyl-5,6-dimethylbenzimidazole in an yield of 42.2 g (75.4%).

SYNTHETIC EXAMPLE 8

2-Chlorophenylbenzimidazole (CPBI)

The operation of Synthetic example 4 was repeated, except that 35.2 g (0.25 mol) of p-chlorobenzaldehyde was used in place of p-n-butylbenzaldehyde, to obtain the aimed 2-p-chlorophenylbenzimidazole in an yield of 47.3 g (82.1%).

EXAMPLES 41-63 and Comparative example 3

A rubber composition consisting of 100 parts by weight of a styrene-butadiene rubber, 37.5 parts by weight of aroma oil, 65 parts by weight of ISAF carbon black and 3 parts by weight of zinc oxide was compounded with 3 parts by weight of benzimidazole or its derivative described in the following Table 3 together with variant amounts of 1,3-diphenylguanidine, 2-mercaptobenzothiazole and sulfur, and the resulting mixtures were vulcanized such that the resulting vulcanizates would have substantially the same modulus. Each of the resulting vulcanizates was measured with respect to its tan $\delta$ at 80° C. under a 1% dynamic strain by means of a viscoelastomer made by Rheometrix Co. The obtained results are shown in Table 3.

A vulcanizate of a rubber composition containing neither benzimidazole nor its derivative was evaluated in the same manner as described above, and the obtained result is also shown in Table 3 as Comparative example 3.

TABLE 3

| | Comparative example 3 | Example 41 | Example 42 | Example 43 | Example 44 | Example 45 | Example 46 | Example 47 | Example 48 | Example 49 |
|---|---|---|---|---|---|---|---|---|---|---|
| Benzimidazole used | — | ABI | HBI | HDBI | BPBI | OOPBI | PMBI | PDMBI | CPBI | PBI |
| Tan $\delta$ at 80° C. | 0.173 | 0.220 | 0.221 | 0.209 | 0.217 | 0.213 | 0.219 | 0.221 | 0.221 | 0.220 |

| | Example 50 | Example 51 | Example 52 | Example 53 | Example 54 | Example 55 | Example 56 | Example 57 | Example 58 |
|---|---|---|---|---|---|---|---|---|---|
| Benzimidazole used | MBI | NZ | GBI | PDBI | CBI | ANBI | EMBI | CTCMBI | benzimidazole |
| Tan $\delta$ at 80° C. | 0.224 | 0.222 | 0.218 | 0.226 | 0.225 | 0.226 | 0.219 | 0.227 | 0.226 |

| | Example 59 | Example 60 | Example 61 | Example 62 | Example 63 |
|---|---|---|---|---|---|
| Benzimidazole used | MPBI | NBI | FPMBI | DMBI | BIU |
| Tan $\delta$ at 80° C. | 0.217 | 0.210 | 0.219 | 0.216 | 0.215 |

It can be seen from the results shown in Table 3 that all the rubber compositions obtained in Examples 41-63 are higher in the value of tan $\delta$ at high temperature range than the rubber composition obtained in Comparative example 3.

EXAMPLES 64-66 AND COMPARATIVE EXAMPLE 4

A rubber composition consisting of 100 parts by weight of a styrene-butadiene rubber having a styrene content of 35%, 80 parts by weight of ISAF carbon black, 100 parts by weight of aroma oil, 1 part by weight of stearic acid, 1 part by weight of an antioxidant (IPPD), 3 parts by weight of zinc oxide, 0.3 part by weight of an accelerator of DPG, 0.7 part by weight of an accelerator of DM and 1.5 parts by weight of sulfur was compounded with 5 parts by weight of a benzimidazole derivative shown in the following Table 4 to prepare a rubber composition. A tire having a size of 205/515-13 (for front wheel) or 225/515-13 (for rear wheel) was produced by using the above obtained rubber composition in its tread rubber.

The tire was driven at a speed as high as possible on a circuit having a one-round length of 4.41 km, and lap times in every lap from 10th to 20th laps were measured, and the best lap time among 10th to 20th laps was determined. For comparison, a tire of Comparative example 4 was produced in the same manner as described in the above Examples 64-66 by using a rubber composition containing neither benzimidazole nor its derivative defined in the present invention, and the best lap time among 10th to 20th laps was determined in the same manner as described above. The best lap time of the tire of Comparative example 4 was calculated as an index 100, and the best lap time of the tire of Examples 64-66 was indicated by an index, which is a reciprocal of the ratio of the best lap time of the tire of Examples 64-66 to that of the tire of Comparative example 4.

The obtained results are shown in Table 4.

In Table 4, a larger index illustrates that the lap time is shorter, and the grip performance at high speed running of the tire is more excellent.

acid shown in the following Table 5, and the resulting mixture was kneaded to obtain an unvulcanized rubber composition. The resulting rubber composition was measured with respect to its Mooney scorch time $t_5$ at 130° C. according to JIS K6300. The obtained results are shown in Table 5.

In Table 5, Example 88 illustrates a rubber composition produced by previously mixing imidazole with a Brönsted acid.

Mooney viscosity was also measured with respect to rubber compositions prepared without the addition of Brönsted acid as illustrated in Comparative examples 5 and 6, and the obtained results are also shown in Table 5.

TABLE 5

| | Comparative example 5 | Example 67 | Example 68 | Example 69 | Example 70 | Example 71 | Example 72 | Example 73 | Example 74 | Example 75 |
|---|---|---|---|---|---|---|---|---|---|---|
| Brönsted acid used | — | α-naphthyl-carboxylic acid | phthalic acid | trimellitic acid | pyro-mellitic acid | cinnamic acid | benzoic acid | p-chloro-benzoic acid | p-nitro-benzoic acid | p-methoxy-benzoic acid |
| Mooney scorch time, $t_5$ (min) | 6.6 | 8.9 | 7.8 | 18.4 | 10.8 | 8.4 | 12.4 | 10.8 | 11.1 | 8.6 |

| | Example 76 | Example 77 | Example 78 | Example 79 | Example 80 | Example 81 | Example 82 | Example 83 | Example 84 |
|---|---|---|---|---|---|---|---|---|---|
| Brönsted acid used | rhodinic acid | succinic acid | maleic acid | 4,4'-thiobis(3-methyl-6-tert-butylphenol) | 4,4'-butylidene-bis(3-methyl-6-tert-butylphenol) | acetic acid | p-toluene-sulfonic acid | sulfuric acid | phosphoric acid |
| Mooney scorch time, $t_5$ (min) | 9.4 | 7.5 | 9.2 | 7.5 | 8.4 | 7.5 | 15.1 | 12.4 | 7.5 |

| | Example 85 | Example 86 | Comparative example 6 | 87 | 88 |
|---|---|---|---|---|---|
| Brönsted acid used | phosphorous acid | phosphoric acid di(2-ethylhexyl) ester | — | p-toluene-sulfonic acid | p-toluene-sulfonic acid |
| Mooney scorch time, $t_5$ (min) | 9.2 | 8.3 | 6.5 | 14.1 | 16.7 |

Note:
1) Imidazole used in Comparative example 5 and Examples 67-86 is C18C11Z.
2) Imidazole used in Comparative example 6 and Examples 87 and 88 is 1B2MZ; and in Example 88, equimolar amounts of 1B2MZ and p-toluenesulfonic acid were dissolved in methanol, and the methanol solution was refluxed for 3 hours to be condensed, and the condensed solution was used.

TABLE 4

| | Comparative example 4 | Example 64 | Example 65 | Example 66 |
|---|---|---|---|---|
| Benzimidazole used | — | HBI | MBI | PDBI |
| Best lap time among 10th to 20th laps | 100 | 104 | 105 | 106 |

It can be seen from the results of Table 4 that all the rubber compositions of the present invention are more excellent in grip performance than the rubber composition of Comparative example 4.

EXAMPLES 67-88 AND COMPARATIVE EXAMPLES 5-7

To 100 parts by weight of a styrene-butadiene rubber were added 37.5 parts by weight of aroma oil, 65 parts by weight of ISAF carbon black, 3 parts by weight of zinc oxide, 0.5 part by weight of 1,3diphenylguanidine, 1.5 parts by weight of dibenzothiazyl disulfide, and 1.5 parts by weight of sulfur, and further added 0.01 mol of 1-stearyl-2-undecylimidazole (C18C11Z) or 1-benzyl-2-methylimidazole (1B2MZ) and 0.01 mol of a Brönsted It can be seen from Table 5 that, when a Brönsted acid is used in combination with an imidazole, the resulting rubber composition has not a drawback of poor scorch resistance inherent to a rubber composition containing imidazole alone, and has an improved scorch time.

Then, the unvulcanized rubber compositions of Examples 67, 69, 71, 73, 75, 76, 79 and 80 were vulcanized, and the resulting vulcanizates were measured with respect to their tan δ at 80° C. under a 1% dynamic strain by means of a viscoelastometer made by Rheometrix Co. The unvulcanized rubber composition of Comparative example 5 was vulcanized in the same manner as described above, and the value of tan δ at 80° C. of the vulcanizate was measured in the same manner as described above. The following Table 6 shows the difference in the value of tan δ at 80° C. between the vulcanizates of rubber compositions of Examples 67, 69, 71, 73, 75, 76, 79 and 80 and the vulcanizate of a rubber composition of Comparative example 5. For comparison, the difference in the value of tan δ at 80° C. between the vulcanizate of a rubber composition of Comparative example 5 and the vulcanizate of a rubber composition of Comparative example 7, which contains neither imidazole nor Brönsted acid, is also shown in Table 6.

TABLE 6

|  | Example 67 | Example 69 | Example 71 | Example 73 | Example 75 | Example 76 | Example 79 | Example 80 | Comparative example 7 |
|---|---|---|---|---|---|---|---|---|---|
| Difference of the value of tan δ at 80° C. | +0.029 | +0.062 | +0.031 | +0.045 | +0.043 | +0.032 | +0.036 | +0.041 | −0.022 |

Note: Comparative example 7 illustrates a rubber composition containing neither imidazole nor Brønsted acid.

It can be seen from Table 6 that the use of imidazole together with Brønsted acid improves synergistically the value of tan δ at high temperature of vulcanized rubber composition.

EXAMPLES 89-91 AND COMPARATIVE EXAMPLES 8-10

To 100 parts by weight of a styrene-butadiene rubber were added 37.5 parts by weight of aroma oil, 65 parts by weight of ISAF carbon black, 3 parts by weight of zinc oxide, 0.5 part by weight of 1,3-diphenylguanidine, 1.5 parts by weight of dibenzothiazyl disulfide and 1.5 parts by weight of sulfur, and further added 0.01 mol of 2-anilinobenzimidazole (ABI), 2-phenylbenzimidazole (PBI) or 2-methylbenzimidazole (MBI) and 0.01 mol of each Brønsted acid shown in the following Table 7, and the resulting mixture was kneaded to obtain an unvulcanized rubber composition. The resulting rubber composition was measured with respect to its Mooney scorch time t5 at 130° C. according to JIS K6300. The obtained results are shown in Table 7. For comparison, the same experiments as described above were carried out, except that the Brønsted acid was not used. The obtained results are also shown in Table 7 as Comparative examples 8, 9 and 10.

TABLE 7

|  | Comparative example | | | Example | | |
|---|---|---|---|---|---|---|
|  | 8 | 9 | 10 | 89 | 90 | 91 |
| Benzimidazole used | ABI | PBI | MBI | ABI | PBI | MBI |
| Brønsted acid used | — | — | — | trimellitic acid | p-toluene sulfonic acid | p-methoxy-benzoic acid |
| Mooney scorch time, t5 (min) | 6.0 | 5.9 | 6.1 | 16.1 | 13.5 | 8.2 |

It can be seen from Table 7 that the use of Brønsted acid in combination with benzimidazole can obviate the drawback of poor scorch resistance inherent to a rubber composition containing benzimidazole alone.

As described above, the rubber composition of the first and second aspects of the present invention, which is obtained by compounding a specifically limited amount of a specifically limited imidazole, imidazoline or benzimidazole to a rubber component, has a large tan δ at high temperature range. Therefore, when such rubber composition is used in the tread of a tire, the tire can be prevented from being lowered in the value of tan δ of the tread due to the temperature rising caused by the running of the tire, and the tire has an improved grip performance in the high speed running.

Further, the rubber composition of the third aspect of the present invention, which is obtained by compounding a specifically limited amount of a specifically limited Brønsted acid to a rubber component together with the specifically limited imidazole, imidazoline or benzimidazole, has not the drawback of poor scorch resistance inherent to a rubber composition containing imidazole, imidazoline or benzimidazole alone, and has an improved scorch resistance and further has a very large tan δ at high temperature range due to the synergistic effect of the imidazole, imidazoline or benzimidazole and the Brønsted acid. When such rubber composition is used in the tread of a tire, the tire can be prevented from being lowered in the value of tan δ of the tread due to the temperature rising caused by the running of the tire, and the tire has a remarkably improved grip performance in the high speed running.

What is claimed is:

1. A tire, wherein the tread of said tire comprises a rubber composition comprising 100 parts by weight of a rubber component consisting of natural rubber, synthetic rubber, or both, and 0.1-50 parts by weight of at least one member selected from the group consisting of benzimidazole and a benzimidazole derivative selected from the group consisting of 2-anilinobenzimidazole (ABI), 2-phenylbenzimidazole (PBI), 2-hydroxybenzimidazole (HBI), 2-methylbenzimidazole (MBI), 2-phenyl-5-methylbenzimidazole (PMBI), 2-phenyl-5,6-dimethylbenzimidazole (PDMBI), 2-p-chlorophenylbenzimidazole (CPBI), nocodazole (NZ), 2-(2-pyridino)benzimidazole (PDBI), 2-(4-fluorophenyl)-1-methylbenzimidazole (FPMBI), 2-guanidinobenzimidazole (GBI), 2-chloromethylbenzimidazole (CBI), 5-chloro-2-(trichloromethyl)benzimidazole (CTCMBI), 5,6-dimethylbenzimidazole (DMBI), and 2-acetonitrile-benzimidazole (ANBI).

2. A tire, wherein the tread of said tire comprises a rubber composition comprising 100 parts by weight of a rubber component consisting of natural rubber, synthetic rubber or both, and 0.1-50 parts by weight of at least one imidazole compound selected from the group consisting of 2-methylimidazole (2MZ), 2-undecylimidazole (C11Z), 2-heptadecylimidazole (C17Z), 2-phenylimidazole (2PZ), 2-ethyl-4-methylimidazole (2E4MZ), 2-phenyl-4-methylimidazole (2P4MZ), 1-benzyl-2-methylimidazole (1B2MZ), 1-cyanoethyl-2-methylimidazole (2MZ-CN), 1-cyanoethyl-2-undecylimidazole (C11Z-CN), 1-cyanoethyl-2phenylimidazole (2PZ-CN), 2,4-diamino-6-{(2'-methylimidazolyl (1')}ethyl-S-triazine (2MZ-AZINE), 2,4-diamino-6-{2'-undecylimidazolyl (1')}ethyl-S-triazine (C11Z-AZINE), 2,4-diamino-6-{2'-ethyl-4'-methylimidazolyl (1')}ethyl-S-triazine (2E4MZ-AZINE), 1-(p-toluenesulfonyl)imidazole (PTZ), 2,4,5-tribromoimidazole (TBZ), 4-methylimidazole (4MZ), N-trimethylsilylimidazole (TSZ), 2-mercapto-1-methylimidazole (1M2MrZ), p-(imidazole-1-yl)phenol (4ZP), N-acetylimidazole (1AZ), urocanic acid (U-acid), imidazole-4,5-dicarboxylic acid (ZD-acid), 1-

(2,4,6-trimethylbenzenesulfonyl)imidazole, 2-methyl-5-nitro-1-imidazole-ethanol (2M5N1EZ), 2-phenyl-4,5-dioxymethylimidazole (2PHZ), 2-phenyl-4-methyl-5-oxymethylimidazole (2P4MHZ),
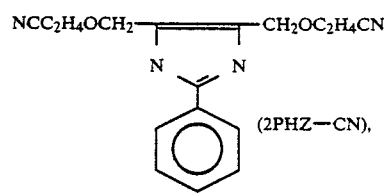
(2PHZ—CN),
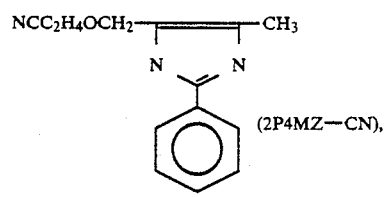
(2P4MZ—CN),
* * * * *